United States Patent [19]

Wernimont

[11] Patent Number: 4,597,460
[45] Date of Patent: Jul. 1, 1986

[54] MULTIPLE LOAD CELL WEIGHING STRUCTURE

[76] Inventor: T. August Wernimont, 2801 Cathmar Ave., Burlington, Iowa 52601

[21] Appl. No.: 703,204

[22] Filed: Feb. 19, 1985

[51] Int. Cl.$^4$ .................... G01G 9/00; G01G 19/52; G01G 1/34; G01G 3/14
[52] U.S. Cl. .................................. 177/211; 177/132; 177/204; 177/255; 177/263; 177/1
[58] Field of Search ................... 177/1, 132, 134, 204, 177/211, 229, 255, 263, DIG. 9

[56] References Cited

U.S. PATENT DOCUMENTS

| | | | |
|---|---|---|---|
| 2,899,191 | 8/1959 | Hunt | 177/211 |
| 3,593,263 | 7/1971 | Olsen | 177/134 X |
| 4,364,442 | 12/1982 | Flickinger | 177/211 X |

Primary Examiner—E. A. Goldberg
Assistant Examiner—Patrick W. Foster

[57] ABSTRACT

A weighing structure using four (4) strain gage-type load cells, which significantly reduces the complexity of existing four (4) load cell weighing structures, is provided. A novel method of constructing and electrically connecting the load cells is provided to mechanically match the output of the individual load cells.

2 Claims, 7 Drawing Figures

MULTIPLE LOAD CELL WEIGHING STRUCTURE

TECHNICAL FIELD OF THE INVENTION

This invention relates to weighing scales and more particularly, to those scales using electronic sensing and display techniques.

BACKGROUND OF THE INVENTION

Platform weighing scales utilizing electronic strain gages as sensing elements are constructed using either a single compact load cell element with mechanical levers to transmit the load from the weighing platform to the load cell, or with multiple load cells to support the weighing platform directly. The single load cell design is less costly to manufacture, but the mechanical levers can be difficult to locate and position in confined spaces. They also have the potential to introduce undesirable bearing friction, thereby reducing the accuracy of the weight measurement. Electronic scales using multiple load cells eliminate the mechanical levers and the friction problem, but the cost of the load cells often make these scales prohibitively expensive. The present invention meets the desire to utilize the advantages of directly supporting the weighing platform without incurring the high cost of multiple load cells.

TECHNICAL BACKGROUND OF THE INVENTION

Figure 1:
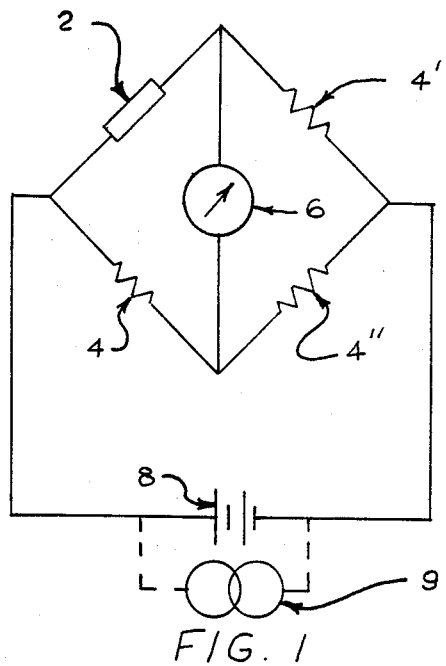
FIG. 1 is the basic circuit used to detect changes in strain gage resistance.

FIG. 1 will be recognizable to those practiced in the art as the basic bridge circuit used to detect the small changes in resistance that occurs in strain gages when they are loaded. At least one (1) strain gage 2 is required and the matching resistor 4, 4' and 4" may be either strain gages or inactive resistive elements of the same resistance value as the strain gage 2. Bridge balancing circuits and temperature-compensating circuits normally used with precision weighing scales utilizing this bridge circuit are omitted to clarify the principles of operation. Excitation of the bridge circuit can either be by direct current as illustrated by battery 8 or by alternating current 9. Any change in the resistance of strain gage 2 causes an unbalance in the circuit and this unbalance is detected by meter 6, which can be designed to read weight directly in engineering units.

Figure 2:
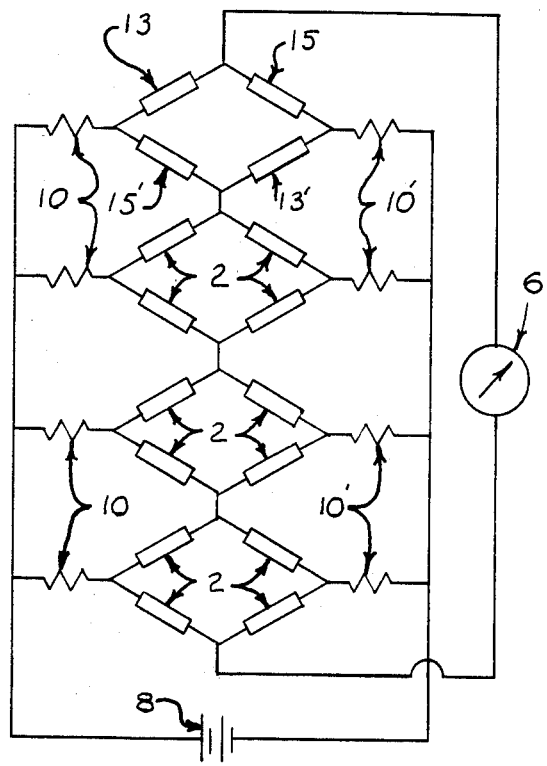
FIG. 2 is a method patented by Ruge to connect four (4) load cells each comprised of four (4) strain gage elements.

FIG. 2 shows a four (4) bridge circuit where each bridge circuit represents one load cell and all the resistive elements in the bridge circuit are active strain gages. These four (4) load cells are often located at the four (4) corners of a weighing platform, and their outputs are electrically summed so that a total weight can be displayed on meter 6. Each load cell is a single load carrying member with four (4) strain gages affixed to it.

The uppermost bridge circuit in FIG. 2 illustrates the operation of this circuit. The strain gages are oriented on the load carrying specimen in such a manner as to cause two (2) gages 15 and 15' to experience a tensile strain, which is an increase in resistance, and two (2) gages 13 and 13' to experience a compressive strain, which is a decrease in resistance. This arrangement of the strain gages induces the maximum unbalance in the circuit for meter 6 to detect. This method of constructing a weighing apparatus is disclosed in Laimins' U.S. Pat. No. 3,512,595 and the electrical circuit is disclosed in Ruge's U.S. Pat. No. 2,815,480.

Resistors 10 and 10' are used to adjust the output of each load cell so that a weight placed anywhere on the weighing platform will weigh the same weight regardless of where it is positioned, since the output of each load cell varies due to differences in the load carrying specimen and the strain gages used.

SUMMARY OF THE INVENTION

The present invention consists of four (4) bending beam-type load cells that have a single strain gage affixed to each beam in a highly strained location. Two (2) of these load cells are positioned so that the strain gage on the load cell is oriented in such a manner as to experience a tensile strain when a load is applied to the weighing platform. The other two (2) load cells are positioned so that the strain gage on the load cell is oriented in such a manner as to experience a compressive strain when a load is applied to the platform. These strain gages are oriented in the bridge circuit so that the two (2) strain gages experiencing tension are diametrically opposite each other, and the two (2) strain gages experiencing compression are in the other two (2) legs of the bridge, also diametrically opposite of each other.

Matching of the output of the individual load cells is provided by mechanically increasing or decreasing the bending moment at each load cell, thereby increasing or decreasing the strain detected by the strain gages. This adjustment is necessary because of the variation in the load cells, and it allows a scale to accurately determine an object's weight regardless of where the weight is placed on the weighing platform.

DETAILED DESCRIPTION OF THE INVENTION

While this invention can be embodied in many different forms, there is shown in the drawings, and described in detail, a preferred embodiment of the invention. The present disclosure is to be considered as an exemplification of the principle of the invention and is not intended to limit the invention to the embodiment illustrated.

Figure 5:
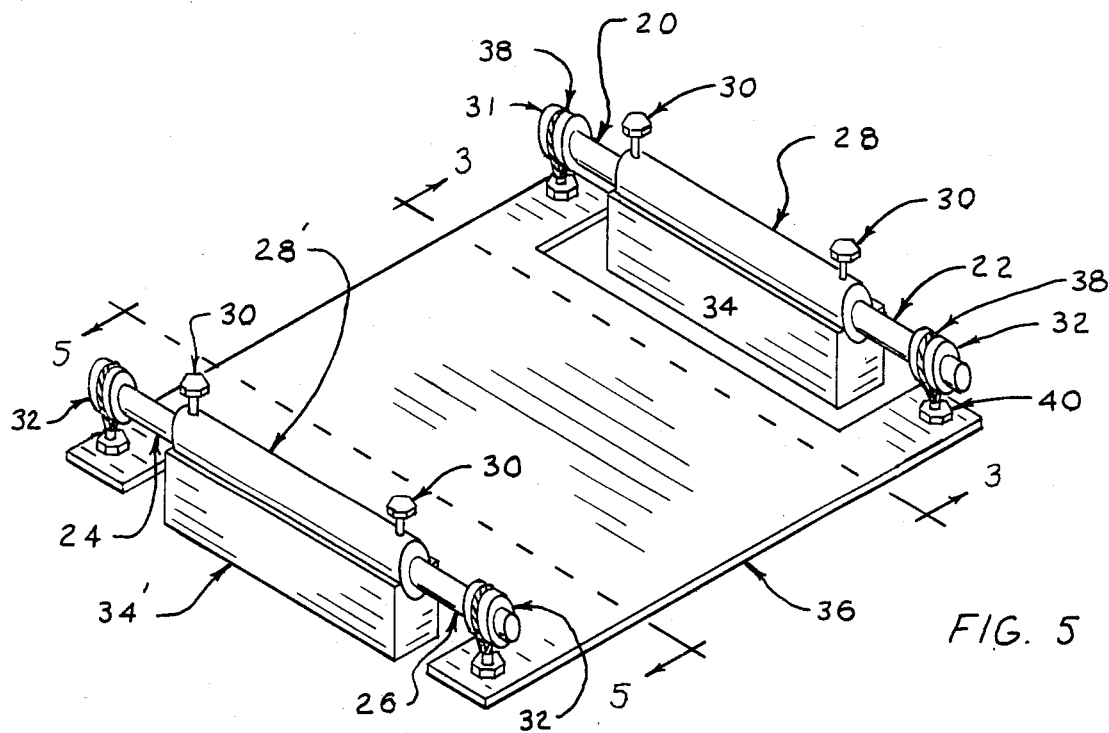
FIG. 5 is an isometric view of a weighing structure utilizing my invention.

FIG. 5 illustrates a weighing platform 36 supported at all four (4) corners by load support beams 20, 22, 24, and 26. These load support beams are in turn supported by support tubes 28 and 28' and support assembly 34 and 34' that rests on any level surface, such as a floor, table, or another machine.

Figure 4:
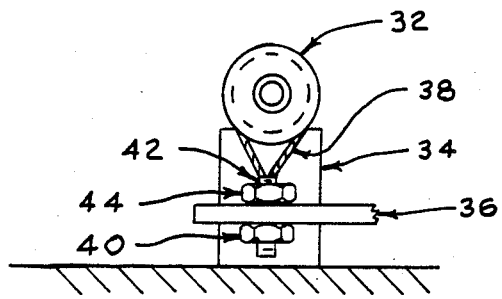
FIG. 4 is a detailed view of a means of connecting the weighing platform to the load support beams or load cells generally taken along plane 7—7 of FIG. 7.

FIG. 4 illustrates weighing platform 36 fastened to threaded anchor 42 that allows vertical adjustment of platform 36 until it is essentially horizontal by turning nut 40. After it is adjusted, locking nut 44 is tightened to securely hold anchor 42 in position. Anchor 42 is tubular in design allowing cable 38 to be formed into a loop and both ends inserted into the top end of anchor 42 and securely fastened to 42 by use of a suitable adhesive, such as epoxy. Cable 38 is passed over hanger collar 32 that is either threaded onto load support beams 22, 24, 26, or constructed as an alternate design 31, as illustrated in FIG. 6, whereby it is slipped over load support beam 20 and held in position by setscrew 29.

Figure 6:
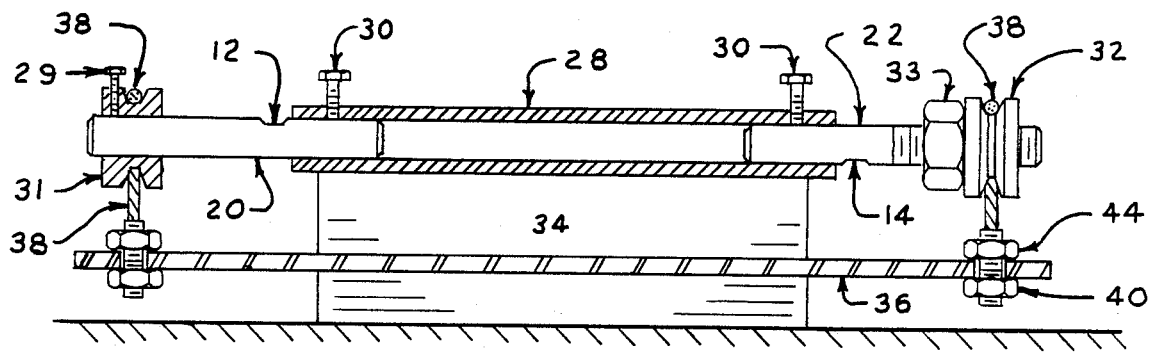
FIG. 6 is a side elevation view, partly in section, generally taken along plane 3—3 of FIG. 5, showing the orientation of strain gages, the load carrying structure, and the means of adjusting the bending moment on each load support beam.
Figure 7:
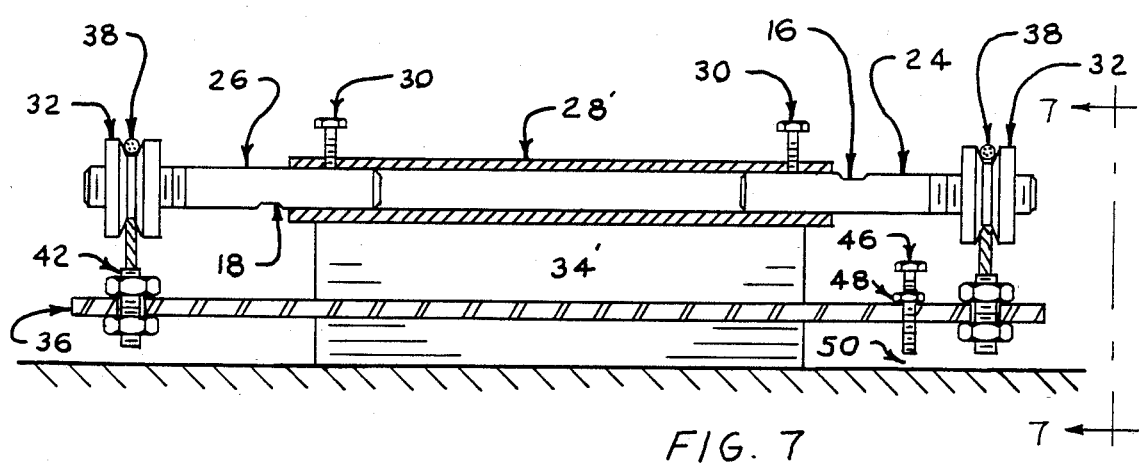
FIG. 7 is a side elevation view, partly in section, generally taken along plane 5—5 of FIG. 5, showing the orientation of strain gages, the load carrying structure, and the means of adjusting the bending moment on each load support beam.

Load support beams 20, 22, 24, and 26 are held by support tubes 28 and 28' that allow lateral adjustment of the spacing between support cables 38, as illustrated in FIGS. 6 and 7.

Load support beams 20, 22, 24, and 26 each have a single strain gage affixed in a highly strained location, as illustrated in FIGS. 6 and 7. Two (2) strain gages, 12 and 16, are affixed to support beams 20 and 24 respectively, and they are oriented to experience tensile strain when a load is applied to platform 36. The other two (2) strain gages, 14 and 18, are affixed to support beams 22 and 26 respectively, and they are oriented to experience compressive strain when a load is placed on weighing platform 36.

Figure 3:
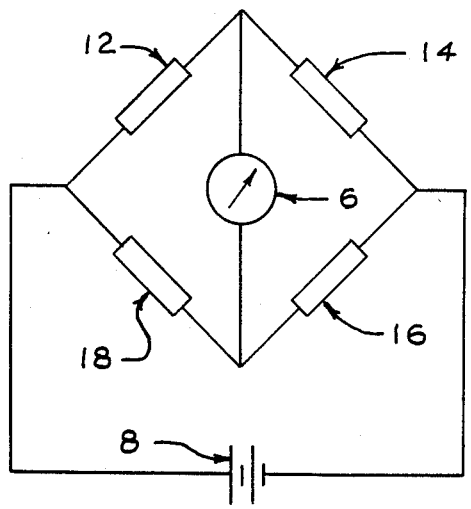
FIG. 3 is the circuit used by my invention.

Strain gages 12, 14, 16, and 18 are electrically interconnected, as illustrated in FIG. 3, to yield a composite reading on meter 6 of the total weight, regardless of where the weight is placed on weighing platform 36.

Since all load support beams do not deflect the same amount and all strain gages do not have identical charges in resistance when the same load is applied due to material and manufacturing variations, a means of adjusting the output of the individual strain gages is described. For those load support beams and strain gage combinations reading too low, hanger collar 32, or alternate design 31, are moved outwardly away from the strain gage. This increases the bending moment and therefore the strain detected by the strain gage is increased. Moving the hanger collar inwardly decreases the bending moment on the support beam 20, 22, 24 and 26, and therefore reduces the strain detected by the strain gages. After adjusting the output of each load support beam and strain gage combination, the hanger collar 32 is securely locked into position by jam nut 33, or with the setscrew with alternate hanger collar 31.

Lateral adjustment to maintain support cable 38 vertical is achieved by loosening setscew 30 and sliding load support beam 20, 22, 24, and 26 inwardly or outwardly inside support tube 28 or 28' as needed. After adjustment, setscrews 30 are tightened to securely hold the load support beams in position.

Overload protection of the load support beams and cable suspension system is provided by attaching adjustable stops 46 to weighing platform 36, as illustrated in FIG. 7. When an excess weight is applied to weighing platform 36, the support structure deflects downward, closing gap 50, and allows stop 46 to transmit the load directly to the primary support structure, such as a floor, table, or another machine.

The foregoing specification is intended as illustrative and is not to be taken as limiting. Still other variations within the spirit and scope of the invention are possible and will readily present themselves to those skilled in the art.

What I claim is:

1. A weight detecting sensor assembly comprising:
    (a) A support member suitable for holding four (4) load support beams in an essentially horizontal position. The support member is capable of providing lateral adjustments of the load support beams where
    (b) each load support beam has a strain gage attached to sense the bending load it is supporting with
    (c) a movable collar positioned on the end of each load support beam that is longitudinally adjustable so that the bending moment at the strain gage location can be varied,
    (d) a locking means to secure the movable collars in position on the load support beam, the movable collars having
    (e) a support cable formed into a loop that can be flexibly attached to the movable collars on the load support beam with the support cable possessing
    (f) an anchor assembly that secures the ends of the cable together and attaches the support cable to the weighing platform, the weight detecting sensor assembly further comprising
    (g) an adjustable overload stop that prevents overload damages to the support structure, support beams, collars, cables, and anchors.

2. A method of constructing an electrical load sensing circuit, comprising the steps of:
    (a) Attaching the strain gage sensing elements to four (4) independent load carrying members,
    (b) orienting the strain gage sensing elements on the load carrying members so that two (2) strain gages detect tension and two (2) strain gages detect compression,
    (c) connnecting the strain gages in a bridge circuit so that the two (2) tension and the two (2) compression elements are in diametrically opposite legs of the bridge circuits, and
    (d) connecting the circuits to a suitable meter to read the object weight in engineering units.

* * * * *